United States Patent
Chrabascz et al.

(10) Patent No.: US 10,619,650 B2
(45) Date of Patent: Apr. 14, 2020

(54) AIR CYCLE MACHINE FAN AND COMPRESSOR HOUSING

(71) Applicant: Hamilton Sundstrand Corporation, Windsor Locks, CT (US)

(72) Inventors: Eric Chrabascz, Longmeadow, MA (US); Seth E. Rosen, Middletown, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 526 days.

(21) Appl. No.: 15/148,533

(22) Filed: May 6, 2016

(65) Prior Publication Data
US 2017/0321722 A1    Nov. 9, 2017

(51) Int. Cl.
*F01D 5/02*    (2006.01)
*B64D 13/06*    (2006.01)
(Continued)

(52) U.S. Cl.
CPC ........... *F04D 29/624* (2013.01); *B64D 13/06* (2013.01); *B64D 13/08* (2013.01); *F01D 5/02* (2013.01);
(Continued)

(58) Field of Classification Search
CPC .... F04D 29/624; F04D 29/626; F04D 29/644; F04D 29/646; F04D 25/04;
(Continued)

(56) References Cited

U.S. PATENT DOCUMENTS 4,721,313 A    1/1988    Pennink
5,309,735 A    5/1994    Maher, Jr. et al.
(Continued)

FOREIGN PATENT DOCUMENTS

CN    101882817 A    11/2010
CN    102221016 A    10/2011
(Continued)

OTHER PUBLICATIONS

First Chinese Office Action for Chinese Patent Application No. 201510398376.7, dated Jul. 2, 2018, 19 pages.
(Continued)

*Primary Examiner* — Christopher Verdier
(74) *Attorney, Agent, or Firm* — Kinney & Lange, P.A.

(57) ABSTRACT

A fan and compressor housing for an air cycle machine includes a fan inlet disposed around a center axis of the housing and having a fan inlet mounting flange, a compressor outlet having a compressor outlet mounting flange, and a compressor inlet having a compressor inlet mounting flange. The fan inlet mounting flange has a pinhole disposed thereon configured to receive a pin from a fan inlet diffuser housing and a fan inlet counterbore configured to receive a mating component from the fan inlet diffuser housing. The compressor outlet mounting flange has a compressor outlet counterbore configured to receive a first mating component from a condenser/reheater. The compressor inlet mounting flange has a compressor inlet counterbore configured to receive a second mating component from the condenser/reheater.

16 Claims, 10 Drawing Sheets

(51) Int. Cl.
*B64D 13/08* (2006.01)
*F04D 17/10* (2006.01)
*F04D 25/04* (2006.01)
*F04D 29/42* (2006.01)
*F04D 29/44* (2006.01)
*F04D 29/52* (2006.01)
*F04D 29/54* (2006.01)
*F04D 29/62* (2006.01)
*F04D 29/64* (2006.01)

(52) U.S. Cl.
CPC .............. *F04D 17/10* (2013.01); *F04D 25/04* (2013.01); *F04D 29/4206* (2013.01); *F04D 29/4226* (2013.01); *F04D 29/4233* (2013.01); *F04D 29/441* (2013.01); *F04D 29/522* (2013.01); *F04D 29/541* (2013.01); *F04D 29/626* (2013.01); *F04D 29/646* (2013.01); *B64D 2013/0662* (2013.01); *B64D 2013/0688* (2013.01)

(58) Field of Classification Search
CPC .............. F04D 29/4206; F04D 29/4226; F04D 29/441; F04D 29/522; F04D 29/541; F04D 17/10; F04D 29/4233; F04D 17/025; B64D 13/06; B64D 13/08; B64D 2013/0688; B64D 2013/0662
See application file for complete search history.

(56) References Cited

U.S. PATENT DOCUMENTS

| | | | |
|---|---|---|---|
| 6,151,909 A * | 11/2000 | Carter | B64D 13/08 62/402 |
| 8,770,928 B2 | 7/2014 | Chrabascz et al. | |
| 9,086,077 B2 | 7/2015 | Boufflert et al. | |
| 9,103,568 B2 | 8/2015 | Beers et al. | |
| 9,470,234 B2 | 10/2016 | Rosen et al. | |
| 9,546,669 B2 | 1/2017 | Beers et al. | |
| 9,790,958 B2 | 10/2017 | Colson et al. | |
| 10,113,558 B2 | 10/2018 | Chrabascz et al. | |
| 2009/0053051 A1 | 2/2009 | Cvjeticanin | |
| 2011/0164973 A1 | 7/2011 | Smith et al. | |
| 2011/0229313 A1 | 9/2011 | Beers et al. | |
| 2012/0195752 A1 | 8/2012 | Partida et al. | |
| 2013/0177399 A1* | 7/2013 | McAuliffe | B64D 13/06 415/118 |
| 2013/0287555 A1 | 10/2013 | Rosen et al. | |
| 2014/0030080 A1 | 1/2014 | Chrabascz et al. | |
| 2014/0199167 A1 | 7/2014 | Beers et al. | |
| 2015/0098814 A1 | 4/2015 | Colson et al. | |
| 2015/0233386 A1 | 8/2015 | Beers et al. | |
| 2016/0083099 A1 | 3/2016 | Beers et al. | |
| 2016/0097401 A1* | 4/2016 | Beers | F04D 19/00 415/207 |
| 2016/0281721 A1 | 9/2016 | Army, Jr. et al. | |
| 2017/0107993 A1 | 4/2017 | Colson et al. | |
| 2017/0191499 A1 | 7/2017 | Chrabascz et al. | |
| 2017/0321722 A1 | 11/2017 | Chrabascz et al. | |
| 2019/0078468 A1 | 3/2019 | Haas et al. | |

FOREIGN PATENT DOCUMENTS

| | | |
|---|---|---|
| CN | 102400942 A | 4/2012 |
| CN | 102562641 A | 7/2012 |
| CN | 102713303 A | 10/2012 |
| CN | 103062130 A | 4/2013 |
| CN | 203109694A U | 8/2013 |
| CN | 103375425 A | 10/2013 |
| CN | 104903587 A | 9/2015 |
| EP | 3073121 A1 | 9/2016 |

OTHER PUBLICATIONS

Second Chinese Office Action for Chinese Patent Application No. 201510398376.7 dated Mar. 4, 2019, 27 pages.
Extended European Search Report for European Patent Application No. 18248280.2, dated May 22, 2019, 7 pages.

* cited by examiner

AIR CYCLE MACHINE FAN AND COMPRESSOR HOUSING

BACKGROUND

Conventional aircraft environmental control systems incorporate an air cycle machine (ACM) for cooling and dehumidifying air supplied to an aircraft cabin. ACMs include a compressor section to compress air. The compressed air is discharged to a downstream heat exchanger and routed to a turbine. The turbine extracts energy from the expanded air to drive the compressor. The air output from the turbine is generally utilized as an air supply for a vehicle, such as the cabin of an aircraft. ACMs can be used to achieve a desired pressure, temperature, and humidity in the air that is transferred to the environmental control system of the aircraft.

ACMs often have a three-wheel or four-wheel configuration. In a three-wheel ACM, a turbine drives both a compressor and a fan which rotate on a common shaft. In a four-wheel ACM, two turbine sections drive a compressor and a fan on a common shaft. In either configuration, a first airflow can be directed into the compressor section and a second airflow can be directed into the fan section. After the first airflow is compressed by the compressor, the first airflow can be directed to a heat exchanger to cool the first airflow to a desired temperature before the first airflow travels to the turbine or turbines. The second airflow is directed by the fan section towards the heat exchanger to cool the first airflow.

The fan section includes a row of fan blades that rotate to draw the second airflow into the fan section and onto the heat exchanger. Fan blade breakage is one of the primary failure modes of the fan. In the event that one of the fan blades of the fan section should break free of the common shaft during operation, the severed fan blade could impact and damage the housing of the fan section. In traditional ACMs, the housing surrounding the fan section is often integral with the housing of the compressor section, forming a single component with a complex geometry that is expensive to repair or replace. When installing a new fan and compressor housing, improper alignment with mating components can cause decreased system performance.

SUMMARY

In one embodiment, a fan and compressor housing for an air cycle machine includes a fan inlet disposed around a center axis of the housing and having a fan inlet mounting flange, a compressor outlet having a compressor outlet mounting flange, and a compressor inlet having a compressor inlet mounting flange. The fan inlet mounting flange has a pinhole disposed thereon configured to receive a pin from a fan inlet diffuser housing and a fan inlet counterbore configured to receive a mating component from the fan inlet diffuser housing. The compressor outlet mounting flange has a compressor outlet counterbore configured to receive a first mating component from a condenser/reheater. The compressor inlet mounting flange has a compressor inlet counterbore configured to receive a second mating component from the condenser/reheater.

In another embodiment, an air cycle machine includes a first turbine section configured to expand air routed thereto, a second turbine section configured to expand air routed thereto, a fan and compressor section configured to draw in and compress air routed thereto and having a fan and compressor housing. The fan and compressor housing further includes a fan inlet disposed around a center axis of the housing and having a fan inlet mounting flange, a compressor outlet having a compressor outlet mounting flange, and a compressor inlet having a compressor inlet mounting flange. The fan inlet mounting flange has a pinhole disposed thereon configured to receive a pin from a fan inlet diffuser housing and a fan inlet counterbore configured to receive a mating component from the fan inlet diffuser housing. The compressor outlet mounting flange has a compressor outlet counterbore configured to receive a first mating component from a condenser/reheater. The compressor inlet mounting flange has a compressor inlet counterbore configured to receive a second mating component from the condenser/reheater.

DETAILED DESCRIPTION

Figure 1:
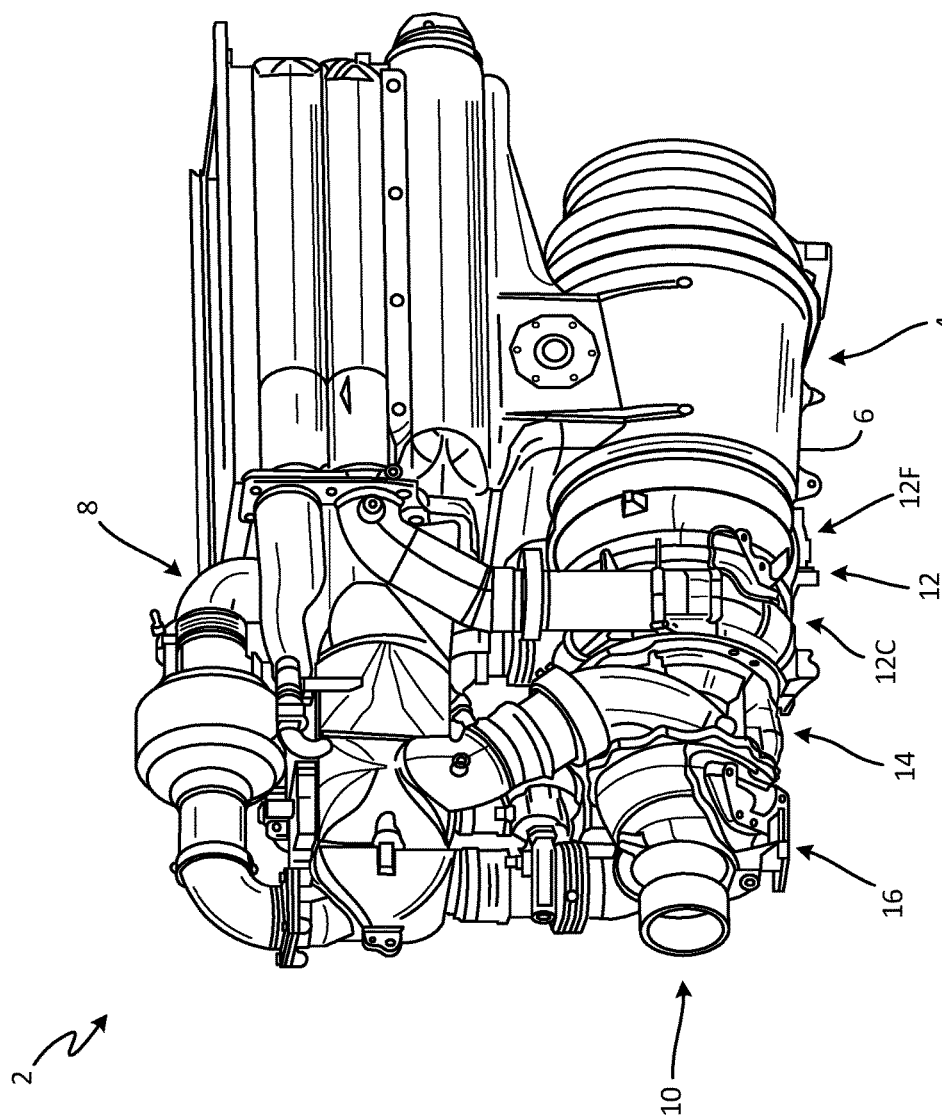
FIG. 1 is a perspective view of an air cycle machine (ACM) assembly.

FIG. 1 is a perspective view of air cycle machine (ACM) assembly 2, which includes fan inlet diffuser 4 with fan inlet diffuser housing 6, condenser/reheater 8, and ACM 10. As shown, ACM 10 includes fan and compressor section 12 (comprising compressor section 12C and fan section 12F), first turbine section 14, and second turbine section 16.

Fan inlet diffuser 4 is connected to condenser/reheater 8 and ACM 10. Condenser/reheater 8 is joined to fan inlet diffuser 4 and ACM 10. ACM 10 is coupled to fan inlet diffuser 4 and condenser/reheater 8. Fan and compressor section 12 is connected to fan inlet diffuser 4, condenser/reheater 8, and first turbine section 14. Fan section 12F of fan and compressor section 12 is connected to fan inlet diffuser housing 6 of fan inlet diffuser 4. Compressor section 12C is connected to condenser/reheater 8 and first turbine inlet section 14. First turbine section 14 is joined to condenser/reheater 8, fan and compressor section 12, and second turbine section 16. Second turbine section 16 is coupled to condenser/reheater 8 and first turbine section 14.

ACM 10 conditions air to a desired pressure, temperature and humidity. Fan section 12F typically draws ram air into ACM 10 from a ram air scoop or other component. Fan inlet diffuser housing 6 of fan inlet diffuser 4 mounts to fan section 12F. Fan inlet diffuser 4 slows the velocity of air drawn in by fan section 12F of fan and compressor section 12. Air routed to compressor section 12C can be compressed and routed to condenser/reheater 8. Condenser/reheater 8 can cool air leaving compressor section 12C. First turbine section 14 and second turbine section 16 extract energy from air routed therein. Air can then be routed from second turbine section 16 to an environmental control system. ACM assembly 2 can be used to achieve a desired pressure, temperature, and humidity in the air that is transferred to the environmental control system of an aircraft.

Figure 2:
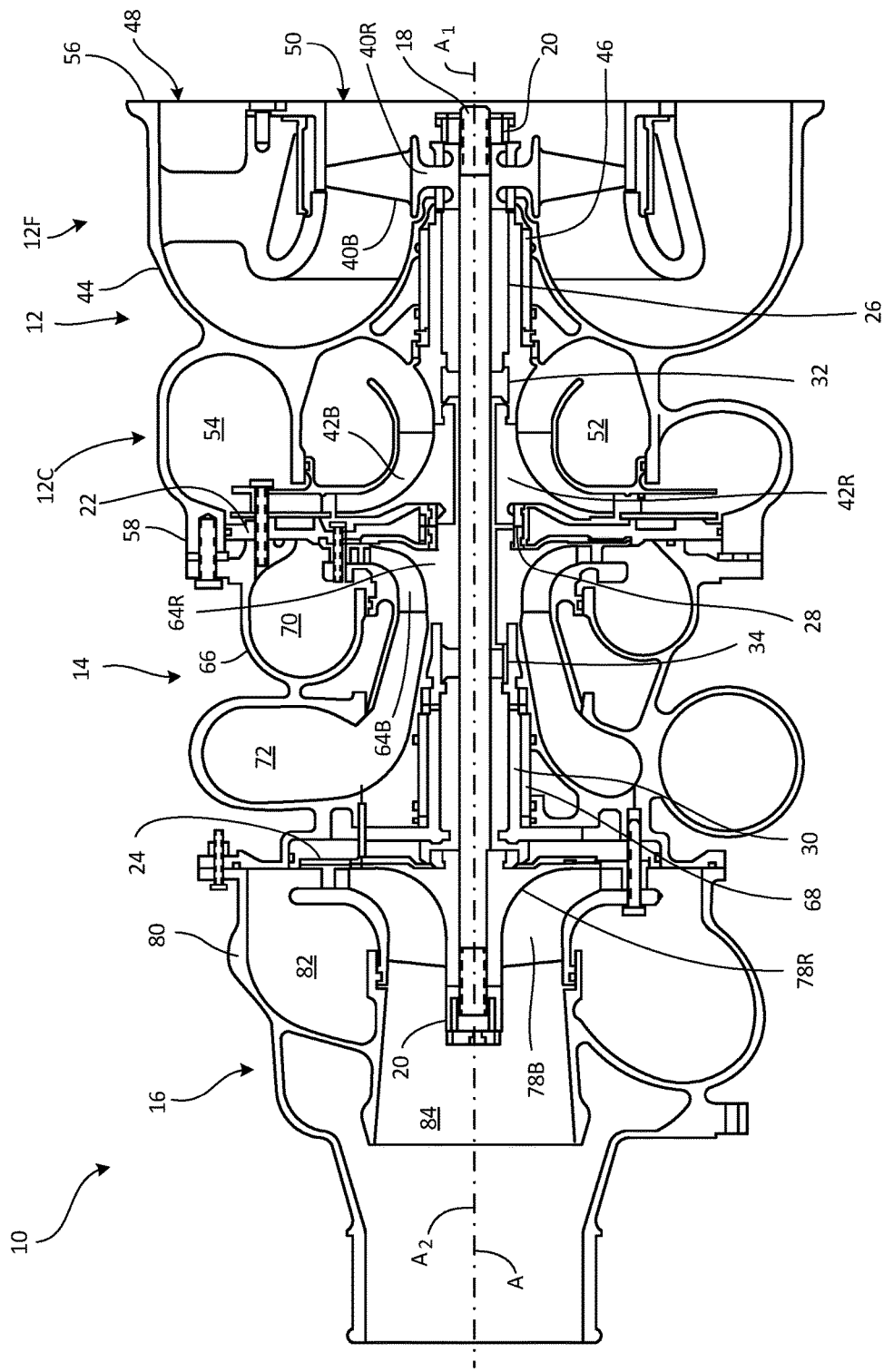
FIG. 2 is a cross-sectional view of an ACM of an ACM assembly.

FIG. 2 is a cross-sectional view of ACM 10. As shown in FIG. 2, ACM 10 includes fan and compressor section 12 (comprising compressor section 12C and fan section 12F), first turbine section 14, second turbine section 16, tie rod 18, balance nuts 20, first seal plate 22, second seal plate 24, first rotating shaft 26, second rotating shaft 28, third rotating shaft 30, first bearing 32, and second bearing 34. Fan and compressor section 12 includes fan rotor 40R with blades 40B, compressor rotor 42R with blades 42B, fan and compressor housing 44, first journal bearing 46, fan inlet 48, fan outlet 50, compressor inlet 52, compressor outlet 54, fan mounting flange 56, and mounting surface 58. First turbine section 14 includes first turbine rotor 64R with blades 64B, first turbine housing 66, second journal bearing 68, first turbine inlet 70, and first turbine outlet 72. Second turbine section 16 includes second turbine rotor 78R with blades 78B, second turbine housing 80, second turbine inlet 82, and second turbine outlet 84. Also shown in FIG. 2 is axis A having ends $A_1$ and $A_2$.

Fan and compressor section 12, first turbine section 14, and second turbine section 16 are mounted on tie rod 18, which is disposed on axis A. Balance nuts 20 are located at each end of tie rod 18. Fan and compressor section 12 is connected to seal plate 22 and first turbine section 14. First turbine section 14 is coupled to seal plate 22, seal plate 24, fan and compressor section 12, and second turbine section 16. Second turbine section 16 is connected to first turbine section 14 and second seal plate 24. A radially inner end of first bearing 32 is disposed around tie rod 18, while a radially outer end of first bearing 32 abuts first rotating shaft 26. A radially inner end of second bearing 34 is disposed around tie rod 18, while a radially outer end of first bearing 34 abuts third rotating shaft 30. Second turbine rotor 78R is connected to third rotating shaft 30. Third rotating shaft 30 is coupled to first turbine rotor 64R. First turbine rotor 64R is connected to second rotating shaft 28. Second rotating shaft 28 is coupled to compressor rotor 42R. Compressor rotor 42R is connected to first rotating shaft 26. First rotating shaft 26 is coupled to fan rotor 40R. A radially outer surface of first rotating shaft 26 abuts a radially inner surface of first journal bearing 46. A radially outer surface of third rotating shaft 30 abuts a radially inner surface of second journal bearing 68.

Fan and compressor housing 44 is connected to seal plate 22 and first journal bearing 46. Fan and compressor housing 44 is also coupled to first turbine housing 66 of first turbine section 14 at mounting surface 58. The contours and the outer and inner boundaries of fan inlet 48, fan outlet 50, compressor inlet 52, and compressor outlet 54 are defined by fan and compressor housing 44. Fan inlet 48 is disposed at a radially outward position relative to fan outlet 50 and at an axial position toward $A_1$ relative to mounting surface 58. Fan mounting flange 56 is positioned at the radially outermost end of fan inlet 48. Mounting surface 58 is positioned at the $A_2$ end of fan and compressor section 12. First turbine housing 66 is coupled to seal plate 22, seal plate 24, fan and compressor housing 44, and second turbine housing 80. The contours and the outer and inner boundaries of first turbine inlet 70 and first turbine outlet 72 are defined by first turbine housing 66. Second turbine housing 80 is coupled to seal plate 24 and first turbine housing 66. The contours and the outer and inner boundaries of second turbine inlet 82 and second turbine outlet 84 are defined by second turbine housing 80.

Tie rod 18 and balance nuts 20 clamp fan and compressor section 12, first turbine section 14, and second turbine section 16 together. Fan and compressor housing 44, first turbine housing 66, and second turbine housing 80 together form an overall housing for ACM 10. Seal plate 22 separates flow paths in fan and compressor housing 44 from first turbine housing 66, and seal plate 24 separates flow paths in first turbine housing 66 from second turbine housing 80. First rotating shaft 26 extends between and rotates with fan rotor 40R and compressor rotor 42R. Second rotating shaft 28 extends between and rotates with compressor rotor 42R and first turbine rotor 64R. Third rotating shaft 30 extends between and rotates with first turbine rotor 64R and second turbine rotor 78R. First bearing 32 provides support and a bearing surface for first rotating shaft 26, and second bearing 34 provides support and a bearing surface for the third rotating shaft 30. First journal bearing 46 and second journal bearing 68 support tie rod 18 within the fan and air compressor section 12 and first turbine section 14, respectively. First journal bearing 46 permits rotation of first rotating shaft 26 about axis A, while second journal bearing 68 facilitates rotation of third rotating shaft 30 about axis A.

Fan section 12F can draw ram air into ACM 10 from a ram air scoop or other component. Rotation of fan rotor 40R and blades 40B pulls air into fan inlet 48. Air is then ducted to fan outlet 50 and can be routed to compressor section 12C. Compressor section 12C compresses air routed therein. Compressor rotor 42 and blades 42B rotate to compress air entering through compressor inlet 52. Air is then ducted to compressor outlet 54 and can be routed to first turbine section 14. First turbine section 14 extracts energy from air passing therethrough. First turbine rotor 64R and blades 64B extract energy by expanding air entering first turbine inlet 70. Air is then ducted to first turbine outlet 72 and can be routed to second turbine section 16. Second turbine section 16 further extracts energy from air routed therein. Second turbine rotor 78R and blades 78B extract energy by expanding air entering second turbine inlet 70. Air is then ducted to second turbine outlet 84. The expansion of air in first turbine section 14 and second turbine section 16 drives the rotating components of ACM 10. The expansion of air drives the rotation of second turbine rotor 78. Second turbine rotor 78R imparts rotation on third rotating shaft 30. Third rotating shaft 30 in turn drives the rotation of first turbine rotor 64R. First turbine rotor 64R drives second rotating shaft 28, which in turn rotates compressor rotor 42R. Compressor rotor 42R rotates first rotating shaft 26, which drives the rotation of fan rotor 40R. ACM 10 can deliver air at a desired pressure, temperature, and humidity to the environmental control system of the aircraft.

Figure 3A:
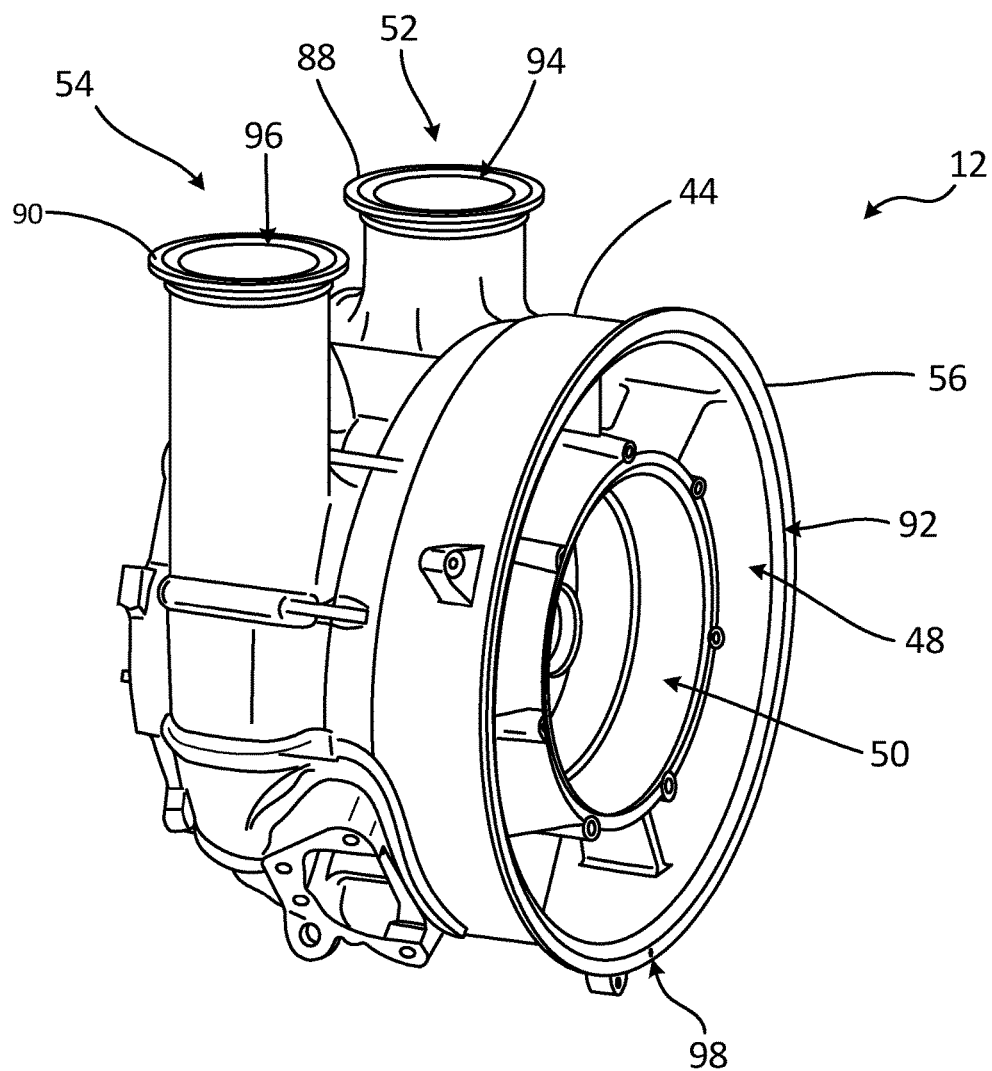
FIG. 3A is an isometric view of a fan and compressor section of an ACM.
Figure 3B:
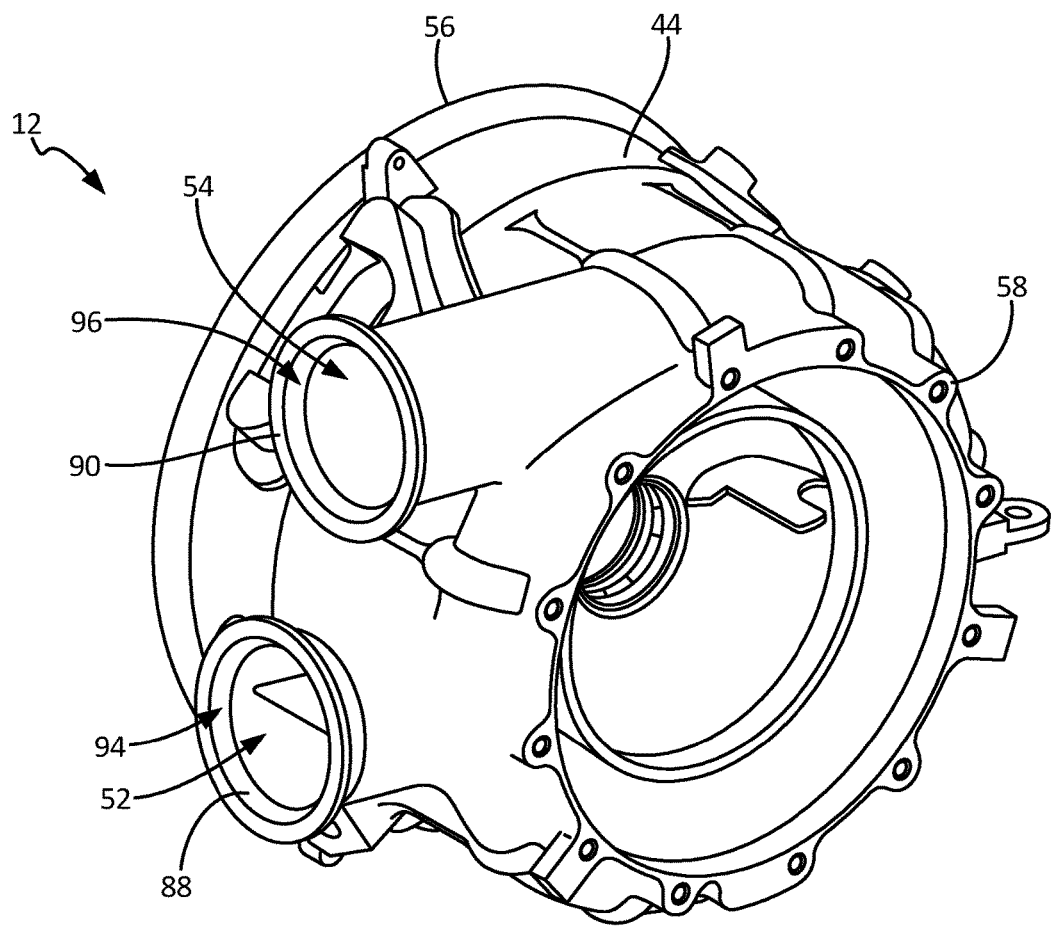
FIG. 3B is a rotated isometric view of the fan and compressor section shown in FIG. 3A.

FIG. 3A is an isometric view of fan and compressor section 12. FIG. 3B is a rotated isometric view of fan and compressor section 12 shown in FIG. 3A. Fan and compressor section 12 includes fan and compressor housing 44, fan inlet 48, fan outlet 50, compressor inlet 52, compressor outlet 54, fan mounting flange 56, compressor inlet mounting flange 88, compressor outlet mounting flange 90, fan inlet counterbore 92, compressor inlet counterbore 94, compressor outlet counterbore 96, and fan inlet flange pinhole 98.

The contours and the outer and inner boundaries of fan inlet 48, fan outlet 50, compressor inlet 52, and compressor outlet 54 are defined by fan and compressor housing 44. Fan inlet 48 is disposed at a radially outward position relative to fan outlet 50. Fan mounting flange 56 is connected to fan and compressor housing disposed around the radially outermost boundary of fan inlet 48. Fan inlet counterbore 92 is positioned at fan inlet 48. Pinhole 98 is disposed on fan mounting flange 56. Compressor inlet mounting flange 88 is connected to fan and compressor housing 44 at compressor inlet 52. Compressor inlet counterbore 94 is positioned at compressor inlet 52. Compressor outlet mounting flange 90 is connected to fan and compressor housing 44 at compressor outlet 54. Compressor outlet counterbore 96 is positioned at compressor outlet 54.

Fan mounting flange 56 provides a mounting surface for fan inlet diffuser housing 6 (See FIG. 1). Fan inlet counterbore 92 can be machined into fan mounting flange 56 at fan inlet 48. Fan inlet counterbore 92 provides radial and angular alignment between fan and compressor section 12 with the mating component of fan inlet diffuser housing 6. Pinhole 98 receives a corresponding pin from fan inlet diffuser housing 6 and controls the rotational alignment between fan inlet compressor section 12 and fan inlet diffuser housing 6. Compressor inlet counterbore 94 and compressor outlet counterbore 96 can be machined into compressor inlet mounting flange 88 and compressor outlet mounting flange 90, respectively. Compressor inlet counterbore 94 ensures radial and angular alignment between fan and compressor section 12 and condenser/reheater 8 (See FIG. 1). Compressor outlet counterbore 96 ensures radial and angular alignment between fan and compressor section 12 and condenser/reheater 8. Fan inlet counterbore 92, pinhole 98, compressor inlet counterbore 94, and compressor outlet counterbore 96 prevent misalignment with fan inlet diffuser housing 6 and condenser/reheater 8 which can result in decreased system performance.

Figure 4A:
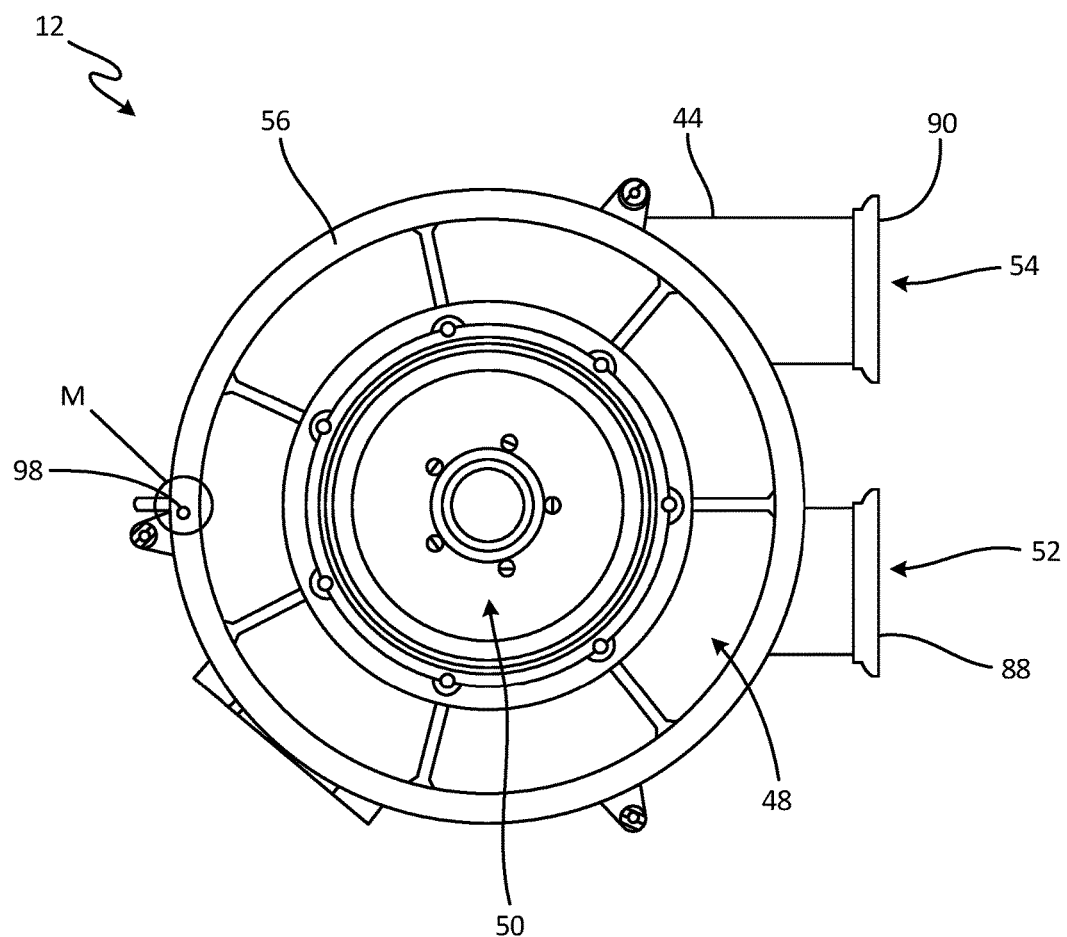
FIG. 4A is a fan inlet facing view of a fan and compressor section.
Figure 4B:
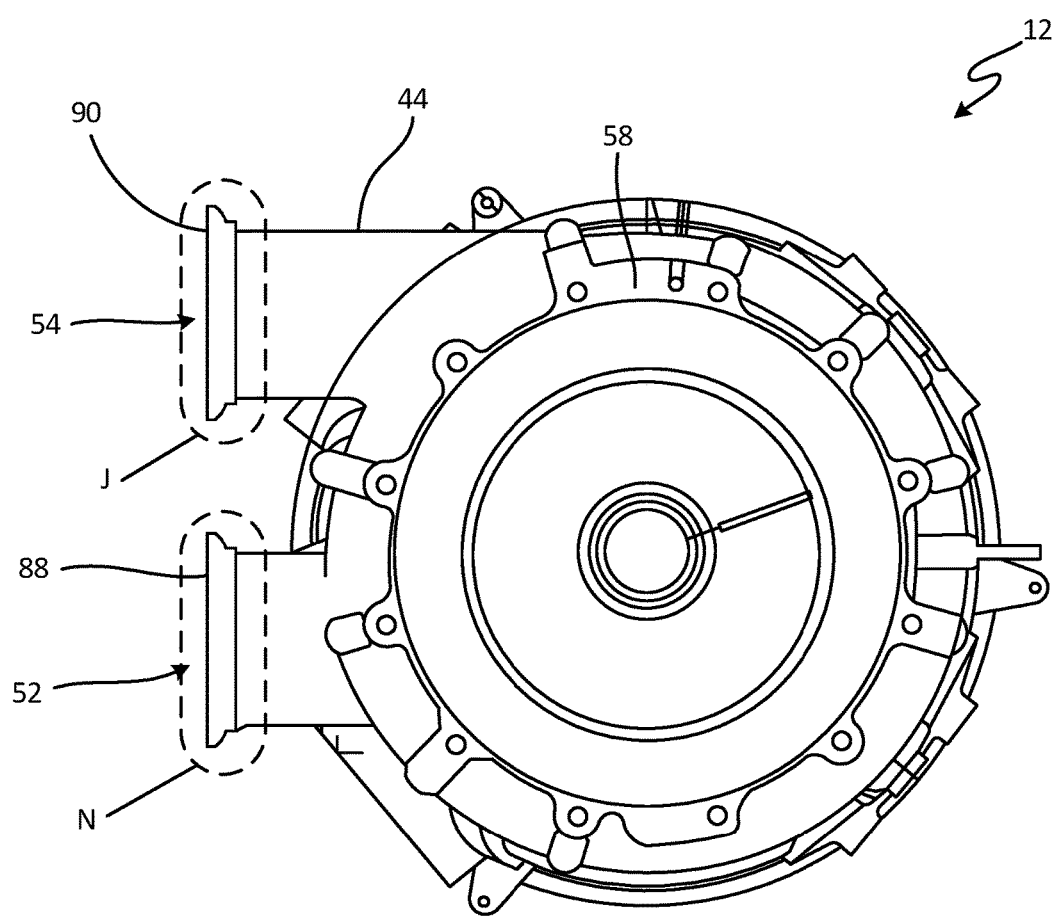
FIG. 4B is a mounting surface facing view of the fan and compressor section shown in FIG. 4A.
Figure 4C:
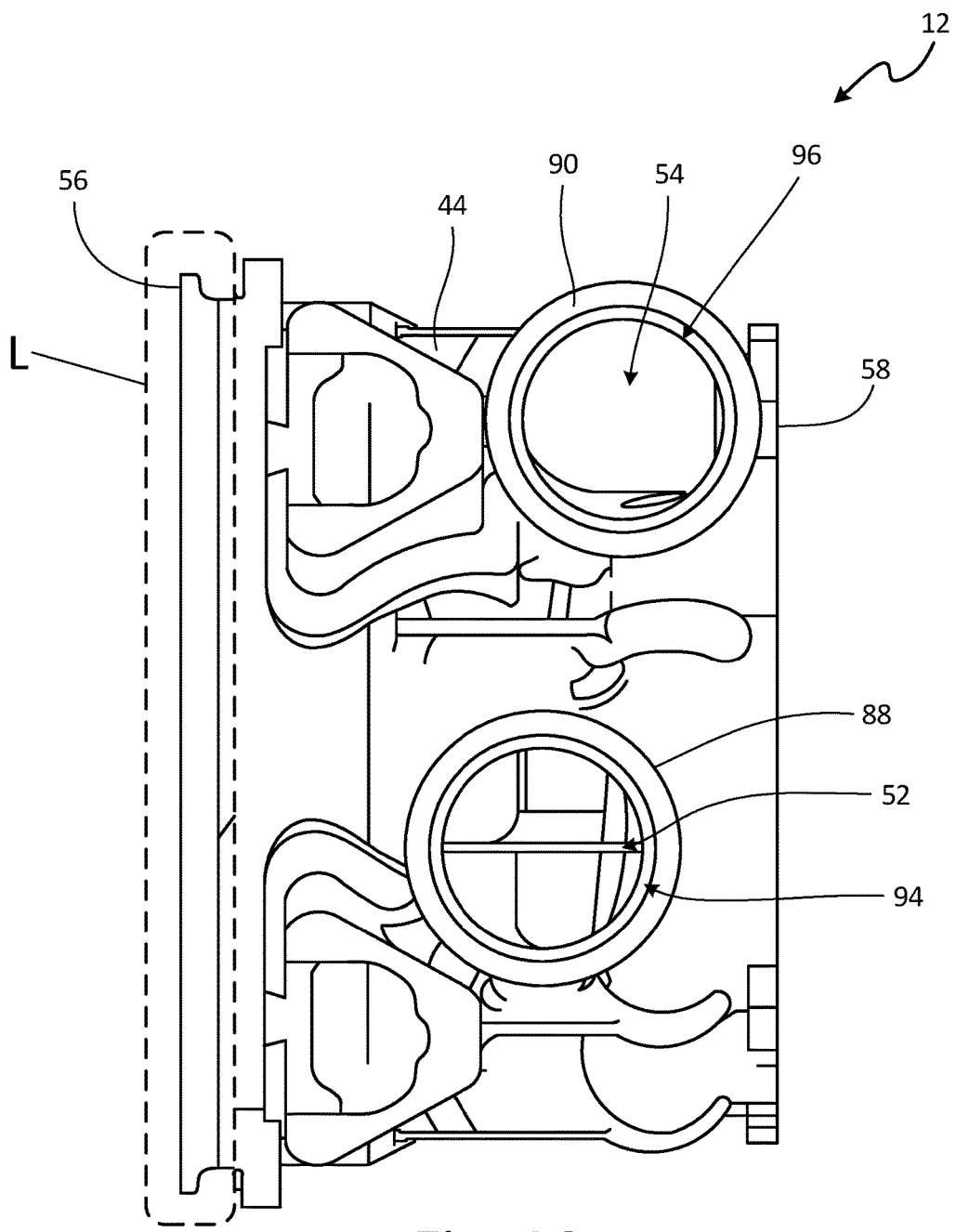
FIG. 4C is a compressor inlet and outlet facing view the fan and compressor section shown in FIG. 4A.

FIG. 4A is a fan inlet facing view of fan and compressor section 12. FIG. 4B is mounting surface facing view of fan and compressor section 12 shown in FIG. 4A. FIG. 4C is a compressor inlet and outlet facing view of fan and compressor housing section 12 shown in FIG. 4A. Fan and compressor section 12 includes fan and compressor housing 44, fan inlet 48, fan outlet 50, compressor inlet 52, compressor outlet 54, fan mounting flange 56, mounting surface 58, compressor inlet mounting flange 88, compressor outlet mounting flange 90, fan inlet counterbore 92, compressor inlet counterbore 94, compressor outlet counterbore 98, and fan inlet flange pinhole 98. Also shown in FIGS. 4A-4C are details M, J, N and L.

Fan mounting flange 56 is connected to fan and compressor at fan inlet 48. Fan inlet counterbore 92 is positioned at fan inlet 48 and is connected to fan mounting flange 56. Pinhole 98 is disposed on fan mounting flange 56. Compressor inlet mounting flange 88 is connected to fan and compressor housing 44 at compressor inlet 52. Compressor inlet counterbore 94 is positioned at compressor inlet 52 and is connected to compressor inlet mounting flange 88. Compressor outlet mounting flange 90 is connected to fan and compressor housing 44 at compressor outlet 54. Compressor outlet counterbore 96 is positioned at compressor outlet 54. Fan inlet counterbore 92 aligns fan and compressor section 12 with the mating fan inlet diffuser housing 6. Pinhole 98 receives a corresponding pin from fan inlet diffuser housing 6 and controls the rotational alignment between fan inlet diffuser housing 6 and fan and compressor section 12. Compressor inlet counterbore 94 provides radial and angular alignment between fan and compressor section 12 and condenser/reheater 8. Compressor outlet counterbore 96 provides radial and angular alignment between fan and compressor section 12 and condenser/reheater 8. Fan inlet counterbore 92, pinhole 98, compressor inlet counterbore 94, and compressor outlet counterbore 96 prevent misalignment with fan inlet diffuser housing 6 and condenser/reheater 8 which can result in decreased system performance.

Figure 5A:
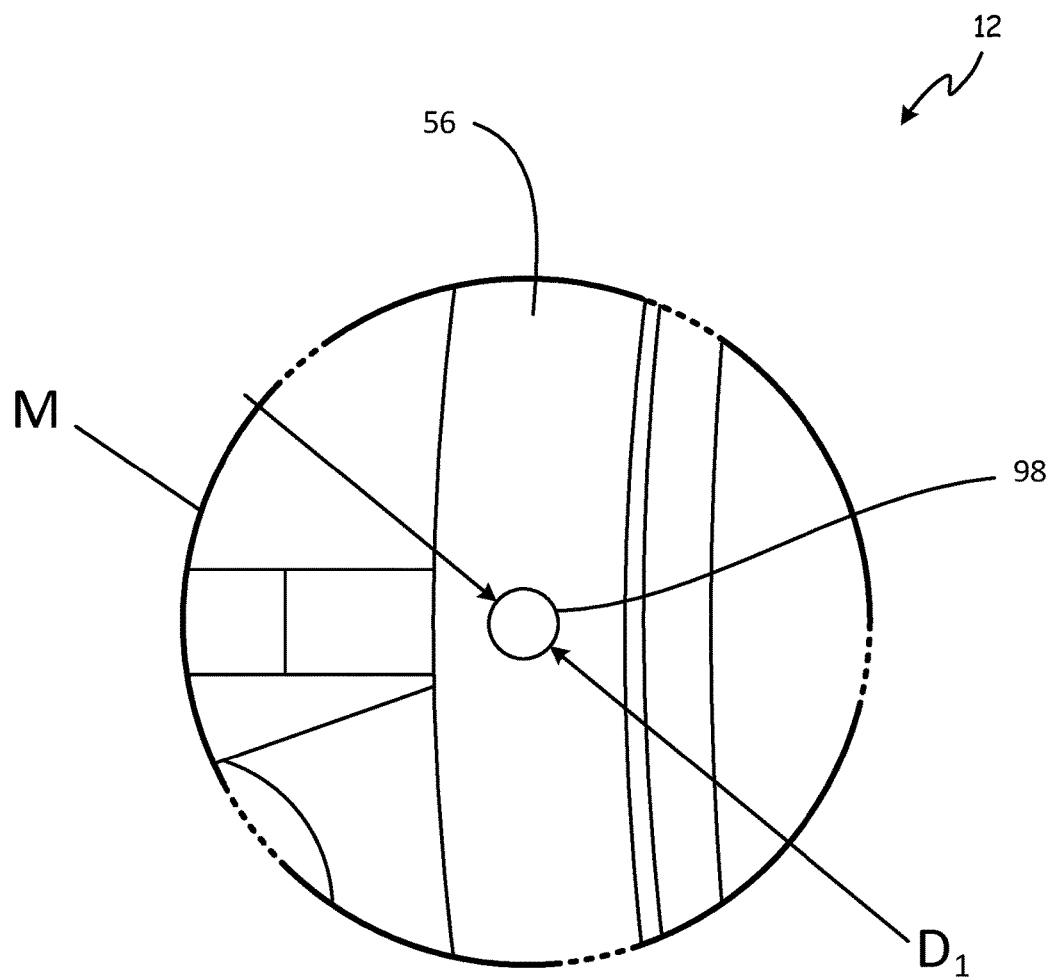
FIG. 5A is an enlarged view of section M of the fan and compressor section shown in FIG. 4A.
Figure 5C:
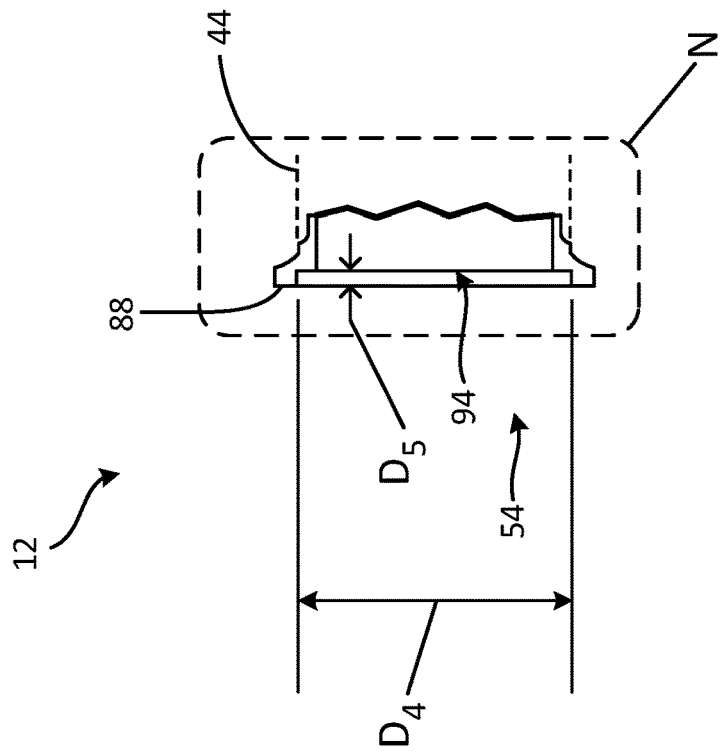
FIG. 5C is an enlarged and partial cutaway view of section N of the fan and compressor section shown in FIG. 4B.
Figure 5B:
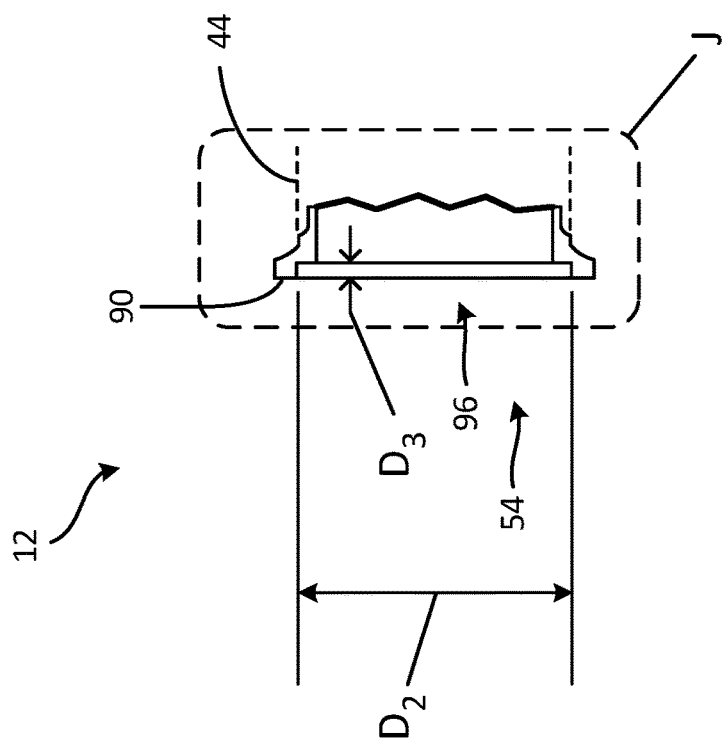
FIG. 5B is an enlarged and partial cutaway view of section J of the fan and compressor section shown in FIG. 4B.
Figure 5D:
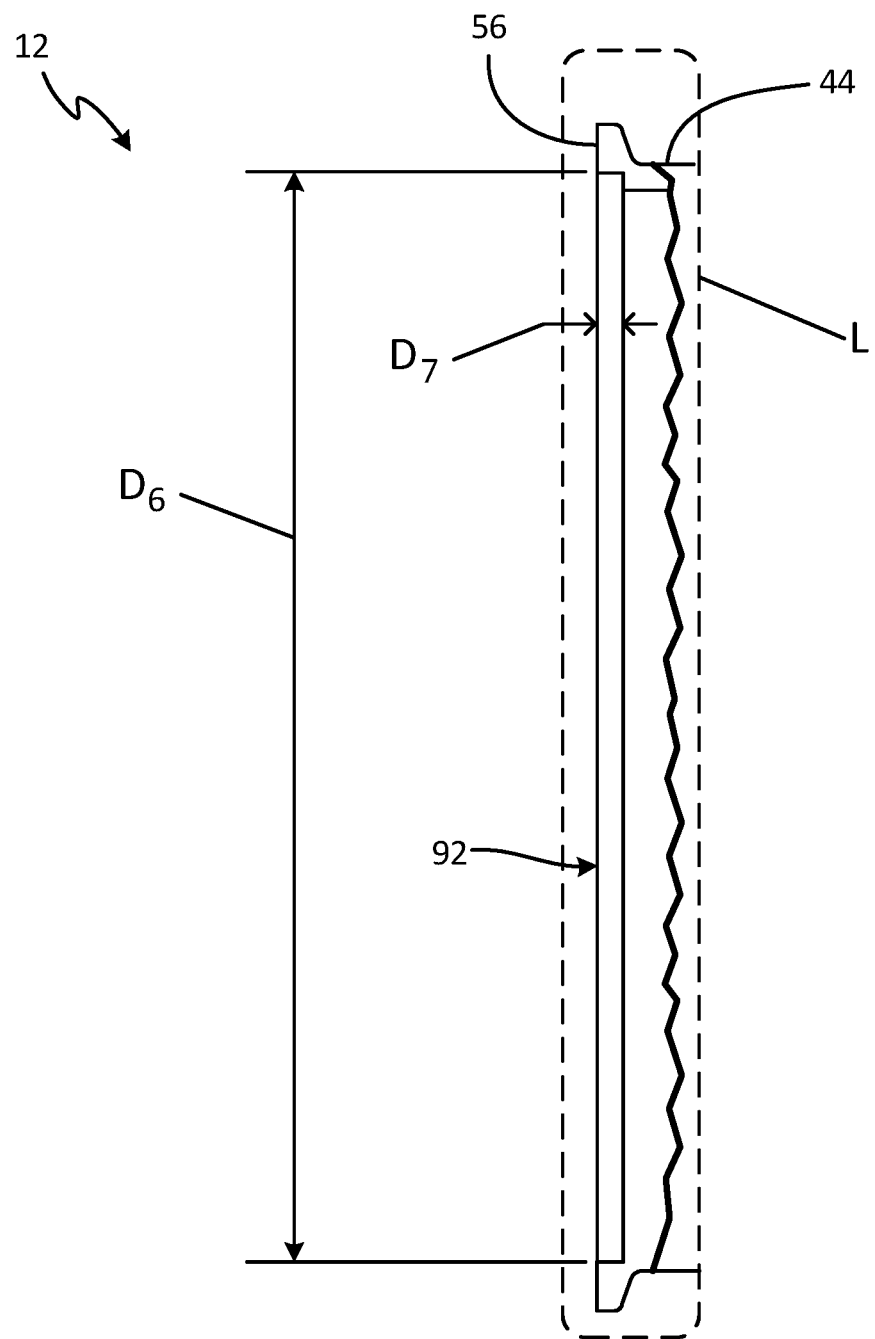
FIG. 5D is an enlarged and partial cutaway view of section L of the fan and compressor section shown in FIG. 4C.

FIG. 5A is an enlarged and partial cutaway view of detail M of fan and compressor section 12 shown in FIG. 4A. FIG. 5B is an enlarged view of detail J of fan and compressor section 12 shown in FIG. 4B. FIG. 5C is an enlarged view of detail N of fan and compressor section 12 shown in FIG. 4B. FIG. 5D is an enlarged view of detail L of the fan and compressor section 12 shown in FIG. 4C. Fan and compressor section 12 includes fan and compressor housing 44, fan inlet 48, fan outlet 50, compressor inlet 52, compressor outlet 54, fan mounting flange 56, compressor inlet mounting flange 88, compressor outlet mounting flange 90, fan inlet counterbore 92, compressor inlet counterbore 94, compressor outlet counterbore 96, and fan inlet flange pinhole 98. Also shown in FIGS. 5A-5D are fan inlet flange pinhole diameter $D_1$, compressor outlet counterbore diameter $D_2$, compressor outlet counterbore depth $D_3$, compressor inlet counterbore diameter $D_4$, compressor inlet counterbore depth $D_5$, fan inlet counterbore diameter $D_6$, and fan inlet counterbore depth $D_7$.

Referring to FIG. 5A, fan inlet flange pinhole 98 is disposed on fan inlet flange 56 at fan inlet 48. Pinhole 98 is configured to receive a corresponding pin from fan inlet diffuser housing 6. In one embodiment, pinhole 98 has diameter $D_1$ at or between 0.137 and 0.145 inches (about 0.348 and 0.368 centimeters).

Referring to FIGS. 5B and 5C, Compressor inlet mounting flange 88 is connected to fan and compressor housing 44 at compressor inlet 52. Compressor inlet counterbore 94 is positioned at compressor inlet 52 and is connected to compressor outlet mounting flange 90. Compressor outlet mounting flange 90 is connected to fan and compressor housing 44 at compressor outlet 54. Compressor outlet counterbore 96 is positioned at compressor outlet 54. In one embodiment, compressor outlet counterbore 96 has a diameter $D_2$ at or between 3.122 and 3.129 inches (about 7.930 and 7.948 centimeters) and depth $D_3$ at or between 0.130 and 0.150 inches (about 0.330 and 0.381 centimeters). Compressor inlet counterbore 94 has a diameter $D_4$ at or between 3.122 and 3.129 inches (about 7.930 and 7.948 centimeters) and depth $D_5$ at or between 0.130 and 0.150 inches (about 0.330 and 0.381 centimeters).

Referring to FIG. 5D, Fan inlet counterbore 92 aligns fan and compressor section 12 with the mating fan inlet diffuser housing 6. Fan mounting flange 56 is connected to fan and compressor at fan inlet 48. Fan inlet counterbore 92 is positioned at fan inlet 48 and is connected to fan mounting flange 56. In one embodiment, fan inlet counterbore 92 has a diameter $D_6$ at or between 11.308 and 11.313 inches (about 28.722 and 28.735 centimeters) and depth $D_7$ at or between 0.230 and 0.240 inches (about 0.584 and 0.610 centimeters). Table 1 provides the list of values for diameter $D_1$, diameter $D_2$, depth $D_3$, diameter $D_4$, depth $D_5$, diameter $D_6$, and depth $D_7$.

TABLE 1

| Dimension | Range (inches) | Range (centimeters) |
| --- | --- | --- |
| $D_1$ | 0.137-0.145 | 0.349-0.368 |
| $D_2$ | 3.122-3.129 | 7.930-7.948 |
| $D_3$ | 0.130-0.150 | 0.330-0.381 |
| $D_4$ | 3.122-3.129 | 7.930-7.948 |
| $D_5$ | 0.130-0.150 | 0.330-0.381 |
| $D_6$ | 11.308-11.313 | 28.722-28.735 |
| $D_7$ | 0.230-0.240 | 0.584-0.610 |

Fan inlet flange pinhole diameter $D_1$ ensures that pinhole 98 can receive the corresponding pin from fan inlet diffuser housing 6. The coupling of pinhole 98 and the mating pin pressed into the flange of the fan inlet diffuser housing 6 controls the rotational alignment of the fan and compressor section 12 in relation to fan inlet diffuser 4. Compressor outlet counterbore diameter $D_2$ and depth $D_3$ ensure that compressor outlet 54 can receive the mating component of condenser/reheater 8. Compressor outlet counterbore 96 having diameter $D_2$ and depth $D_3$ provides angular and radial alignment between compressor outlet 54 and the condenser/reheater 8. Compressor outlet counterbore diameter $D_4$ and depth $D_5$ ensure that compressor outlet 54 can receive the mating component of condenser/reheater 8. Compressor outlet counterbore 94 having diameter $D_4$ and depth $D_5$ provides angular and radial alignment between compressor outlet 54 and the condenser/reheater 8. Fan inlet counterbore diameter $D_6$ and depth $D_7$ ensure that compressor outlet 54 can receive the mating component of fan inlet diffuser housing 6. Fan inlet counterbore 92 having diameter $D_6$ and depth $D_7$ provides angular and radial alignment between fan inlet 48 and the fan inlet diffuser housing 6. Table 2 provides the list of values of ratio ranges for $D_1/D_6$, $D_1/D_7$, $D_6/D_7$, $D_2/D_3$, and $D_4/D_5$.

TABLE 2

| Ratio | Range |
| --- | --- |
| $D_1/D_6$ | 0.012-0.013 |
| $D_1/D_7$ | 0.596-0.604 |
| $D_6/D_7$ | 47.138-49.165 |
| $D_2/D_3$ | 20.860-24.015 |
| $D_4/D_5$ | 20.860-24.015 |

The ratios, individually and in combination, of fan inlet flange pinhole diameter $D_1$ to fan inlet counterbore diameter $D_6$, fan inlet flange pinhole diameter $D_1$ to fan inlet counterbore depth $D_7$, and fan inlet counterbore diameter $D_6$ to fan inlet counterbore depth $D_7$ ensure that pinhole 98 and fan inlet flange 48 can adequately engage the fan inlet diffuser housing 6 for proper alignment. The ratio of compressor outlet counterbore diameter $D_2$ to compressor outlet counterbore depth $D_3$ ensures that compressor outlet flange 54 adequately engages the mating component of condenser/reheater 8. The ratio of compressor inlet counterbore diameter $D_4$ to compressor inlet counterbore depth $D_5$ ensures that compressor outlet flange 52 adequately engages the mating component of condenser/reheater 8. These ratios prevent misalignment, which can result in decreased ACM 10 performance.

In view of the foregoing description it will be recognized that the present disclosure provides numerous advantages and benefits. For example, the coupling of pinhole 98 and the mating pin from fan inlet diffuser housing 6 controls the rotational alignment of fan and compressor section 12 and fan inlet diffuser 4. Compressor inlet counterbore 94 and compressor outlet counterbore 96 ensure radial and angular alignment of the condenser/reheater 8 to fan and compressor section 12. These features, individually and in combination, prevent decreased system performance resulting from misalignment. Additionally, proper alignment ensures better speed sensing measurements. Fan inlet diffuser housing 6 can include a speed sensor for measuring the rotational speed of the rotating components in fan and compressor section 12 of ACM 10. Fan inlet counterbore 92 aligns the sensor of the fan inlet diffuser housing 6 with the rotating components to provide better speed measurements and control.

Discussion of Possible Embodiments

The following are non-exclusive descriptions of possible embodiments of the present invention.

A fan and compressor housing for an air cycle machine according to an exemplary embodiment of this disclosure, among other possible things, includes a fan inlet disposed around a center axis of the housing and having a fan inlet mounting flange, the fan inlet mounting flange having a pinhole disposed thereon configured to receive a pin from a fan inlet diffuser housing and a fan inlet counterbore configured to receive a mating component from the fan inlet diffuser housing, a compressor outlet having a compressor outlet mounting flange, the compressor outlet mounting flange having a compressor outlet counterbore configured to receive a first mating component from a condenser/reheater, and a compressor inlet having a compressor inlet mounting flange, the compressor inlet mounting flange having a compressor inlet counterbore configured to receive a second mating component from the condenser/reheater.

The fan and compressor housing of the preceding paragraph can optionally include, additionally and/or alternatively, any one or more of the following features, configurations and/or additional components:

A fan outlet is disposed radially inward from the fan inlet around the center axis of the housing.

The pinhole has a pinhole diameter $D_1$, the compressor outlet counterbore has a compressor outlet counterbore diameter $D_2$ and a compressor outlet counterbore depth $D_3$, the compressor inlet counterbore has a compressor inlet counterbore diameter $D_4$ and a compressor inlet counterbore depth $D_5$, and the fan inlet counterbore has a fan inlet counterbore diameter $D_6$ and a fan inlet counterbore depth $D_7$.

The ratio of the pinhole diameter $D_1$ to the fan inlet counterbore diameter $D_6$ is at or between 0.012 and 0.013.

The ratio of the pinhole diameter $D_1$ to the fan inlet counterbore depth $D_7$ is at or between 0.596 and 0.604.

The ratio of the fan inlet counterbore diameter $D_6$ to the fan inlet counterbore depth $D_7$ is at or between 47.138 and 49.165.

The ratio of the compressor outlet counterbore diameter $D_2$ to the compressor outlet counterbore depth $D_3$ is at or between 20.860 and 24.015.

The ratio of the compressor inlet counterbore diameter $D_4$ to the compressor inlet counterbore depth $D_5$ is at or between 20.860 and 24.015.

An air cycle machine according to an exemplary embodiment of this disclosure, among other possible things, includes a first turbine section configured to expand air routed thereto, a second turbine section configured to expand air routed thereto, a fan and compressor section configured to draw in and compress air routed thereto and having a fan and compressor housing, the fan and compressor housing further comprising: a fan inlet disposed around a center axis of the housing and having a fan inlet mounting flange, the fan inlet mounting flange having a pinhole disposed thereon configured to receive a pin from a fan inlet diffuser housing and a fan inlet counterbore configured to receive a mating component from the fan inlet diffuser housing, a compressor outlet having a compressor outlet mounting flange, the compressor outlet mounting flange having a compressor outlet counterbore configured to receive a first mating component from a condenser/reheater, and a compressor inlet having a compressor inlet mounting flange, the compressor inlet mounting flange having a compressor inlet counterbore configured to receive a second mating component from the condenser/reheater.

The air cycle machine of the preceding paragraph can optionally include, additionally and/or alternatively, any one or more of the following features, configurations and/or additional components:

A fan outlet is disposed radially inward from the fan inlet around the center axis of the housing.

The pinhole has a diameter $D_1$, the compressor outlet counterbore has a compressor outlet counterbore diameter $D_2$ and a compressor outlet counterbore depth $D_3$, the compressor inlet counterbore has a compressor inlet counterbore diameter $D_4$ and a compressor inlet counterbore depth $D_5$, and the fan inlet counterbore has a fan inlet counterbore diameter $D_6$ and a fan inlet counterbore depth $D_7$.

The ratio of the pinhole diameter $D_1$ to the fan inlet counterbore diameter $D_6$ is at or between 0.012 and 0.013.

The ratio of the pinhole diameter $D_1$ to the fan inlet counterbore depth $D_7$ is at or between 0.596 and 0.604.

The ratio of the fan inlet counterbore diameter $D_6$ to the fan inlet counterbore depth $D_7$ is at or between 47.138 and 49.165.

The ratio of the compressor outlet counterbore diameter $D_2$ to the compressor outlet counterbore depth $D_3$ is at or between 20.860 and 24.015.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fan and compressor housing for an air cycle machine, the housing comprising:
a fan inlet disposed around a center axis of the housing and having a fan inlet mounting flange, the fan inlet mounting flange having a pinhole disposed thereon configured to receive a pin from a fan inlet diffuser housing and a fan inlet counterbore configured to receive a mating component from the fan inlet diffuser housing;
a compressor outlet having a compressor outlet mounting flange, the compressor outlet mounting flange having a compressor outlet counterbore configured to receive a first mating component from a condenser/reheater; and
a compressor inlet having a compressor inlet mounting flange, the compressor inlet mounting flange having a compressor inlet counterbore configured to receive a second mating component from the condenser/reheater.

2. The fan and compressor housing of claim 1, further comprising a fan outlet disposed radially inward from the fan inlet around the center axis of the housing.

3. The fan and compressor housing of claim 1, wherein the pinhole has a pinhole diameter $D_1$, the compressor outlet counterbore has a compressor outlet counterbore diameter $D_2$ and a compressor outlet counterbore depth $D_3$, the compressor inlet counterbore has a compressor inlet counterbore diameter $D_4$ and a compressor inlet counterbore depth $D_5$, and the fan inlet counterbore has a fan inlet counterbore diameter $D_6$ and a fan inlet counterbore depth $D_7$.

4. The fan and compressor housing of claim 3, wherein the ratio of the pinhole diameter $D_1$ to the fan inlet counterbore diameter $D_6$ is between 0.012 and 0.013.

5. The fan and compressor housing of claim 3, wherein the ratio of the pinhole diameter $D_1$ to the fan inlet counterbore depth $D_7$ is between 0.596 and 0.604.

6. The fan and compressor housing of claim 3, wherein the ratio of the fan inlet counterbore diameter $D_6$ to the fan inlet counterbore depth $D_7$ is between 47.138 and 49.165.

7. The fan and compressor housing of claim 3, wherein the ratio of the compressor outlet counterbore diameter $D_2$ to the compressor outlet counterbore depth $D_3$ is between 20.860 and 24.015.

8. The fan and compressor housing of claim 3, wherein the ratio of the compressor inlet counterbore diameter $D_4$ to the compressor inlet counterbore depth $D_5$ is between 20.860 and 24.015.

9. An air cycle machine comprising:
a first turbine section configured to expand air routed thereto;
a second turbine section configured to expand air routed thereto;
a fan and compressor section configured to draw in and compress air routed thereto and having a fan and compressor housing, the fan and compressor housing further comprising:
a fan inlet disposed around a center axis of the housing and having a fan inlet mounting flange, the fan inlet mounting flange having a pinhole disposed thereon configured to receive a pin from a fan inlet diffuser housing and a fan inlet counterbore configured to receive a mating component from the fan inlet diffuser housing;
a compressor outlet having a compressor outlet mounting flange, the compressor outlet mounting flange having a compressor outlet counterbore configured to receive a first mating component from a condenser/reheater; and
a compressor inlet having a compressor inlet mounting flange, the compressor inlet mounting flange having a compressor inlet counterbore configured to receive a second mating component from the condenser/reheater.

10. The air cycle machine of claim 9, further comprising a fan outlet disposed radially inward from the fan inlet around the center axis of the housing.

11. The air cycle machine of claim 9, wherein the pinhole has a pinhole diameter $D_1$, the compressor outlet counterbore has a compressor outlet counterbore diameter $D_2$ and a compressor outlet counterbore depth $D_3$, the compressor inlet counterbore has a compressor inlet counterbore diameter $D_4$ and a compressor inlet counterbore depth $D_5$, and the fan inlet counterbore has a fan inlet counterbore diameter $D_6$ and a fan inlet counterbore depth $D_7$.

12. The air cycle machine of claim 9, wherein the ratio of the pinhole diameter $D_1$ to the fan inlet counterbore diameter $D_6$ is between 0.012 and 0.013.

13. The air cycle machine of claim 9, wherein the ratio of the pinhole diameter $D_1$ to the fan inlet counterbore depth $D_7$ is between 0.596 and 0.604.

14. The air cycle machine of claim 9, wherein the ratio of the fan inlet counterbore diameter $D_6$ to the fan inlet counterbore depth $D_7$ is between 47.138 and 49.165.

15. The air cycle machine of claim 9, wherein the ratio of the compressor outlet counterbore diameter $D_2$ to the compressor outlet counterbore depth $D_3$ is between 20.860 and 24.015.

16. The air cycle machine of claim 9, wherein the ratio of the compressor inlet counterbore diameter $D_4$ to the compressor inlet counterbore depth $D_5$ is between 20.860 and 24.015.

* * * * *